US009667181B2

(12) United States Patent
Scotson

(10) Patent No.: US 9,667,181 B2
(45) Date of Patent: May 30, 2017

(54) MOTOR CONTROL CIRCUIT AND METHOD OF MONITORING A MOTOR

(71) Applicant: TRW Limited, Solihull West Midlands (GB)

(72) Inventor: Peter Geoffrey Scotson, Worcestershire (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 14/768,815

(22) PCT Filed: Feb. 10, 2014

(86) PCT No.: PCT/GB2014/050384
§ 371 (c)(1),
(2) Date: Aug. 19, 2015

(87) PCT Pub. No.: WO2014/128437
PCT Pub. Date: Aug. 28, 2014

(65) Prior Publication Data

US 2015/0381085 A1 Dec. 31, 2015

(30) Foreign Application Priority Data

Feb. 20, 2013 (GB) .................................. 1303006.9
Feb. 22, 2013 (GB) .................................. 1303198.4

(51) Int. Cl.
*H02P 6/16* (2016.01)
*H02P 6/12* (2006.01)
(Continued)

(52) U.S. Cl.
CPC .............. *H02P 6/12* (2013.01); *B62D 5/0487* (2013.01); *H02P 6/24* (2013.01); *H02P 6/28* (2016.02); *H02P 29/0241* (2016.02)

(58) Field of Classification Search
CPC .... H02P 29/0241; H02P 21/22; H02P 29/024; H02P 6/12; H02P 25/024; H02P 29/0243
(Continued)

(56) References Cited

U.S. PATENT DOCUMENTS 6,229,278 B1 * 5/2001 Garces .............. H02M 7/53875 318/801
7,084,601 B2 * 8/2006 Maeda .................. G01R 1/203 318/803
(Continued)

FOREIGN PATENT DOCUMENTS

EP 2403131 A2 1/2012
EP 2424064 A1 2/2012
WO 8404214 A1 10/1984

OTHER PUBLICATIONS

PCT International Search Report and the Written Opinion, Application No. PCT/GB2014/050384 filed Feb. 10, 2014, dated Jun. 25, 2015.

*Primary Examiner* — Bentsu Ro
*Assistant Examiner* — Thai Dinh
(74) *Attorney, Agent, or Firm* — MacMillan, Sobanski & Todd, LLC

(57) ABSTRACT

A method of monitoring an electric motor circuit of the kind comprising an electric motor having a plurality of phases delta configuration, a plurality of electrical switches arranged in a bridge, operable in response to signals from a controller to selectively connect the phases to a power supply, the motor controller being responsive to a current error signal dependent on the difference between a demanded motor current value and an actual motor current value indicative of the actual current flowing in the motor where the method comprising the steps of processing at least one signal that is present in use of the electric motor circuit to identify a frequency component of the at least one signal that meets certain predefined criteria and in the event that the component is identified and that it does meet the criteria providing an indication that there is a fault.

15 Claims, 6 Drawing Sheets

(51) Int. Cl.

| | |
|---|---|
| ***B62D 5/04*** | (2006.01) |
| ***H02P 6/24*** | (2006.01) |
| ***H02P 6/28*** | (2016.01) |
| ***H02P 29/024*** | (2016.01) |

(58) Field of Classification Search

USPC ...... 318/400.04, 400.2, 400.21, 400.26, 722, 318/503

See application file for complete search history.

(56) References Cited

U.S. PATENT DOCUMENTS

| | | | | |
|---|---|---|---|---|
| 7,135,830 | B2 * | 11/2006 | El-Ibiary | H02P 29/664 318/560 |
| 8,471,507 | B2 * | 6/2013 | Akaishi | H02P 21/06 318/400.04 |
| 2003/0160583 | A1 * | 8/2003 | Patel | H02P 21/18 318/400.02 |
| 2004/0100222 | A1 * | 5/2004 | Karikomi | H02P 6/185 318/801 |
| 2005/0258791 | A1 * | 11/2005 | Iwami | B62D 5/049 318/432 |
| 2009/0224707 | A1 | 9/2009 | Williams et al. | |
| 2010/0283500 | A1 | 11/2010 | Zeh et al. | |
| 2011/0270545 | A1 * | 11/2011 | Doktar | G01R 31/025 702/58 |
| 2011/0316466 | A1 | 12/2011 | Uryu | |
| 2012/0001574 | A1 * | 1/2012 | Akaishi | H02P 29/032 318/400.04 |
| 2012/0005092 | A1 | 1/2012 | Pitroda et al. | |
| 2015/0362556 | A1 * | 12/2015 | Lee | G01R 31/343 318/490 |

* cited by examiner

MOTOR CONTROL CIRCUIT AND METHOD OF MONITORING A MOTOR

CROSS-REFERENCE TO RELATED APPLICATIONS

This application is a national stage of International Application No. PCT/GB2014/050384 filed Feb. 10, 2014, the disclosures of which are incorporated herein by reference in entirety, and which claimed priority to Great Britain Patent Application No. 1303006.9, filed Feb. 20, 2013, and Great Britain Patent Application No. 1303198.4, filed Feb. 22, 2013, the disclosures of which are incorporated herein by reference in entirety.

BACKGROUND OF THE INVENTION

This invention relates to improvements in motor control circuits and in particular to pulse width modulation (PWM) control of multiple phase brushless motors. It also relates to methods of monitoring the operation of a motor.

Control systems for PWM controlled electric motors, especially DC motors, generally need to measure the current through the windings or phases of the motor and this can either be done by means of separate current sensors for each of the phases, or by means of a single current sensor that is placed in the circuit so as to measure the total instantaneous current flowing between a D.C. power supply and the bridge circuit and motor combination. In a single current sensor system, the multiple motor phase currents are derived by offsetting the PWM patterns of the switches which apply the required voltage to each phase, and sampling the current sensor at appropriate points.

The measured currents are typically converted into the stationary d-q frame and then combined with a current demand signal, also in the d-q frame, indicative of the current that is demanded from the motor, to produce an error signal. The demand current is itself typically generated as a function of the torque demanded from the motor. The error signal represents the difference between the current that is demanded and the actual measured current. The error signal is fed to a controller which produces a set of voltage demand signals, also typically in the d-q frame, representative of the voltage to be applied to the motor that will best drive the error signal towards zero. The d-q voltages are then converted into PWM signals for the motor phases depending on which PWM strategy is used. The controller therefore acts to vary the PWM phase voltages in order to try to constantly minimise the magnitude of the error signal thereby ensuring that the motor current is as close as possible to the demanded current.

In a practical system the controller will comprise a PI or PID or other type of feedback controller. The frequency of response, or bandwidth, of the feedback controller determines the maximum frequency of change in the motor current that the controller will try to track. Frequencies above this will be largely inconsequential to normal operation of the feedback loop. This normal bandwidth should be set to a high enough level to permit the current in the motor to be tracked but not so high as to track noise and for the circuit to become unstable. Generally the controller responses will be tuned to the time constant of the motor so as to ensure an optimum tracking of the demanded motor current. This is achieved through suitable selection of the gains in the controller, ensuring it is neither over nor under damped and can track the expected changes in current.

Motor drive circuits using feedback control and PWM are well known in the art. For example, WO 2007/072033, discloses a typical system and the teaching of that document is incorporated herein by reference.

BRIEF SUMMARY OF THE INVENTION

According to a first aspect the invention provides a method of monitoring an electric motor circuit of the kind comprising an electric motor having a plurality of phases connected together in a star or delta configuration, a switching circuit comprising a plurality of electrical switches arranged in a bridge, the switches being operable in response to signals from a controller to selectively connect the phases to a power supply so as to cause current to flow through the phases of the motor, the motor controller being responsive to a current error signal dependent on the difference between a demanded motor current value and an actual motor current value indicative of the actual current flowing in the motor, characterised by the method comprising the steps of processing at least one signal that is present in use of the electric motor circuit to identify a frequency content of the at least one signal that meets certain predefined criteria and in the event that the frequency content is identified and that it does meet the criteria providing an indication that there is a fault.

The at least one signal processed by the method may comprise the current error signal that is fed into the controller, or some other signal that is dependent upon the value of the error signal.

Alternatively it may comprise the current flowing in a ground line, or a DC line of the power supply to the motor, and monitoring the measured current to identify the component.

The at least one signal may comprise a current or current error signal expressed in the rotating dq frame.

The method may comprise processing the at least one signal by passing the signal through a high pass filter, the filter having a cut off frequency below the frequency that is being identified. The high pass filter may have a frequency above the bandwidth of the controller. This filter isolates the part of the frequency spectrum that will contain the frequency content of interest, removing other frequency components that are associated with a normal function of the motor drive circuit.

The method may comprise identifying a single frequency of interest or identifying signals of a frequency that lies within a range of frequencies of interest. The method may comprise identifying a frequency component that exceeds the normal bandwidth of the motor controller and motor. By this we mean identifying a frequency component that is higher than any frequency that would normally be imposed on the motor current by the controller when a fault is not present.

The method may comprise identifying a frequency equal to, or substantially equal to, the reciprocal of a twice the time that it takes for a signal to propagate around the control loop that includes the controller, or equal to or substantially equal to the reciprocal of the three times the time taken for a signal to propagate around the control loop, or perhaps the reciprocal of four times the time taken to pass around the loop. For instance, where the controller has a sample rate of 5 khz and signals pass one full loop around the control loop at that frequency, the method may comprise identifying a frequency component of substantially 5 khz, or substantially 2.5 khz or substantially 1.125 khz. The controller may generate the signal that is being tested for the frequency content, such as the error signal, once per pass of the control loop, so the frequency will be a function of the sampling period. For example if the controller sample period is Ts the frequency content that is being detected will be perhaps 1/(2*Ts), or 1/(3*Ts) or 1/(4*Ts) etc.

The control loop frequency typically is set by the sampling frequency of the controller. The method may therefore identify a frequency component that is a multiple of the sampling frequency of the controller, such as twice or three times the sampling frequency. By sampling frequency we mean the frequency at which the controller receives new input signals, such as an updated error signal or an updated current measurement signal from a current sensor.

The method may comprise processing the at least one signal, or a signal derived from it, and determining that it meets at least one of the predefined criteria in the event that the duration over which the signal has been present, either continuously present or discontinuously, meets or exceeds a threshold duration. This step may be performed on the signal output from the high pass filter.

The method may as part of the step of determining that the frequency component of interest exceeds the threshold by passing the at least one signal, or a signal derived from the at least one signal, through a rectifier and then passing the rectified signal through a low pass filter, the low pass filter removing any transient instances of the frequency component, thereby removing any components at the frequency that is of interest that do not meet the criteria.

The method may further comprise, as part of the step of determining if the signal meets the predefined criteria, determine whether the magnitude of the component meets or exceeds a predefined threshold magnitude.

The method may therefore comprise providing an indication of a fault if the identified component has a magnitude above a predetermined threshold, and remains present for a period of time in excess of a predetermined threshold. The method may comprise identifying a frequency component with a magnitude substantially equal to the maximum magnitude that can be created by the controller. This would correspond to the controller working as hard as it can to respond to the large error by constantly switching voltages applied to the motor from one extreme value to the opposite extreme value.

The method may comprise monitoring the current flowing in the motor to identify the frequency component only when the steering is not moving. When it is moving the method may comprise not monitoring for the component.

According to a second aspect the invention provides a motor control circuit for use in controlling an electric motor of the kind having a plurality of phases, the control circuit comprising:

- a switching circuit comprising a plurality of switches arranged in a bridge,
- a motor controller circuit which generates phase voltage signals to be applied to the switches of the switching circuit to cause the switches to selectively connect the phases to the supply rails of the motor so as to cause current to flow through the motor phases according to the torque demanded from the motor,
- at least one current sensor that senses the current flowing in the motor;
- the motor controller being responsive to a current error signal dependent on the difference between a demanded motor current value and an actual motor current value indicative of the actual current flowing in the motor as sensed by the current sensor,
- and a monitoring circuit which in use processes at least one signal that is present in use of the motor circuit and is arranged to identify a frequency component of the at least one signal that meets certain predefined criteria and in the event that the component is identified and that it does meet the criteria providing an indication that there is a fault.

The monitoring circuit may form a part of the motor controller. The motor controller and the monitoring circuit may be embodied in hardware or software, and may process signals in the analogue or the digital domain.

The at least one processed signal may comprise the current error signal.

The monitoring circuit may comprise a high pass filter into which the at least one signal is fed, a rectifier into which the output of the high pass filter is fed, a low pass filter into which the output of the rectifier is fed, and a threshold detector into which the output of the low pass filter is fed. The monitoring circuit may provide an indication of a fault if the output of the threshold detector indicates that the threshold has been passed.

The high pass filter may have a cut of frequency above the bandwidth of the controller but below the frequency of the component that is to be identified. The low pass filter may have a cut off frequency below the bandwidth of the controller.

The monitoring circuit may be arranged to identify a frequency component that exceeds the normal bandwidth of the motor controller and motor. The monitoring circuit may be arranged to identify a frequency equal to, or substantially equal to, a reciprocal of twice the time that it takes for a signal to propagate around the control loop that includes the controller, or equal to or substantially equal to the reciprocal of three times (or a higher integral multiple of) the time taken to propagate around the control loop. For instance, where the controller has a sample rate of 5 khz and passes around the control loop at that frequency, the method may identifying a frequency component of substantially 5 khz, or substantially 2.5 khz or substantially 1.125 khz.

The high pass filter may therefore have a cut-off frequency below the frequency to be identified but above the normal bandwidth of the motor controller and motor. The normal bandwidth is defined as the highest frequency that would be expected to be imposed on the signal in normal use as it responds to current demands at the input of the controller and varies the current to control the error signal. This will typically be at least four times or five times lower than the time for a signal to propagate around the control loop.

The controller may drive the motor phases by generating PWM drive signals that are applied to the switching circuit. The motor may comprise a DC brushless motor.

The circuit may be arranged to stop the motor operation in the event that the monitor indicates a fault is present, or cause the circuit to take some other action. For example, it may remove or reduce the motor current so that the motor is not driven or is driven at lower torques. In a steering system, for example, where the motor provides an assistance torque, this ensures the motor does not lock and prevent the driver turning the steering wheel.

Other advantages of this invention will become apparent to those skilled in the art from the following detailed description of the preferred embodiments, when read in light of the accompanying drawings.

DETAILED DESCRIPTION OF THE INVENTION

Figure 1:
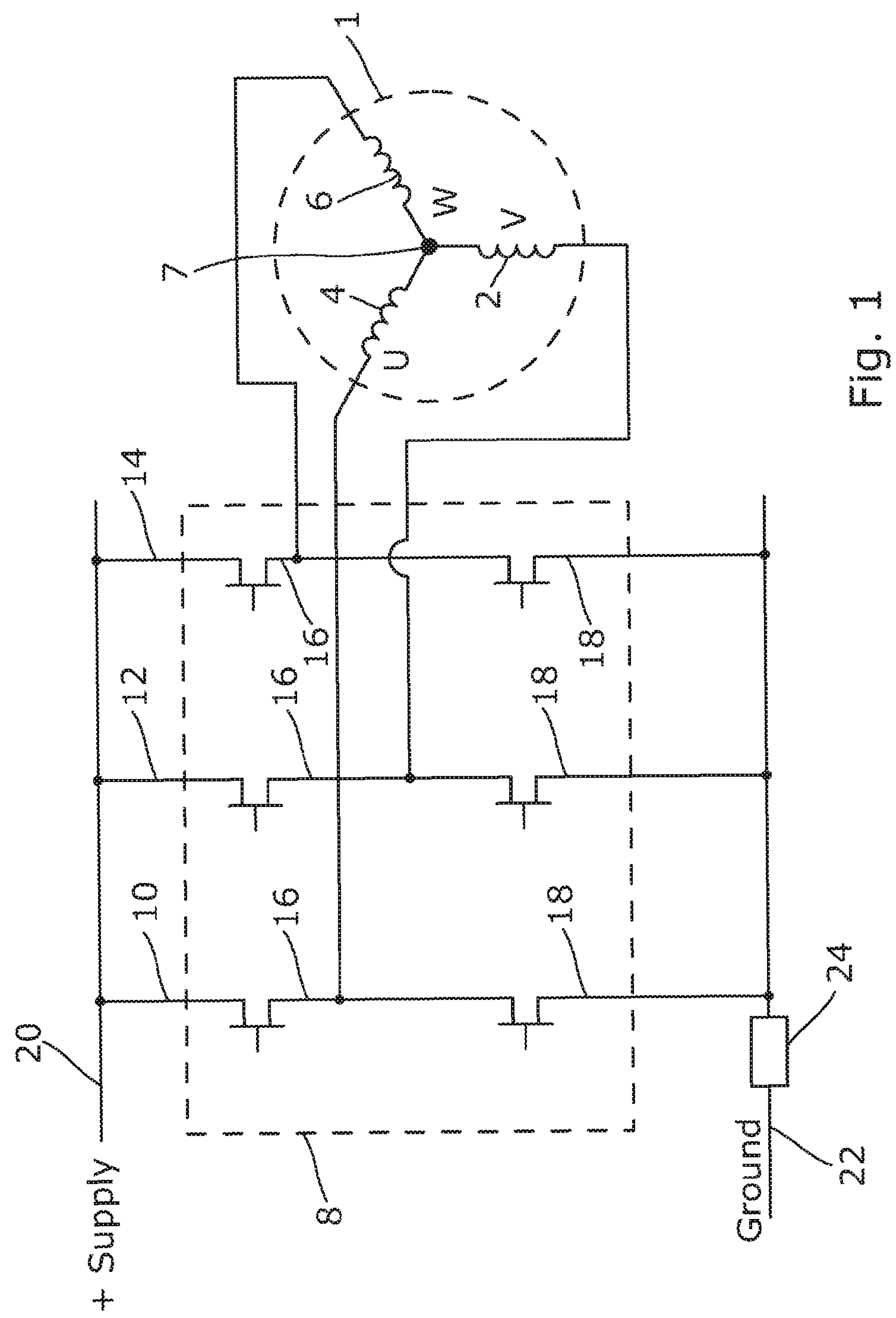
FIG. 1 is schematic diagram showing a three phase PWM controlled motor and an associated switching circuit of a motor control circuit.

Referring to FIG. 1 a three phase brushless motor 1 comprises three motor windings 2, 4, 6, generally designated as phases A, B and C, connected in a star network. One end of each coil is connected to a respective terminal. The other ends of the coils are connected together to form the star centre 7. The free ends are connected to a switching circuit arranged as an H-bridge.

The switching circuit comprises a three phase bridge 8, one for each phase of the motor. Each arm 10, 12, 14 of the bridge comprises a pair of switches in the form of a top transistor 16 and a bottom transistor 18 connected in series between a supply rail 20 and ground line 22. The motor windings 2, 4, 6 are each tapped off from between a respective complementary pair of transistors 16, 18.

Figure 3:
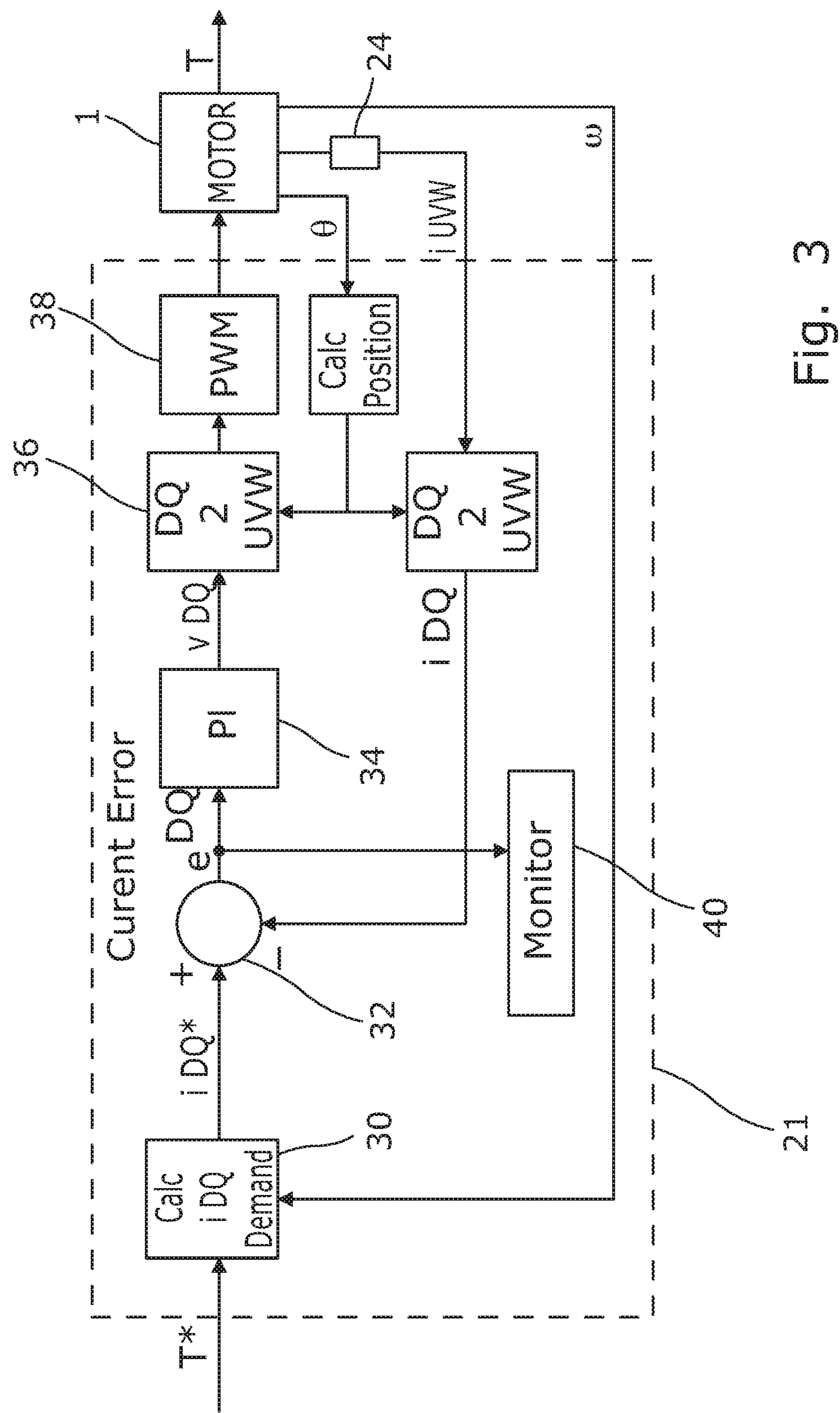
FIG. 3 is a more detailed block diagram of the current controller and motor of the system of FIG. 2.

The transistors 16, 18 are turned on and off in a controlled manner by a motor controller 21, which is shown in detail in FIG. 3 of the drawings, to provide pulse width modulation of the potential applied to each of the phase windings, thereby to control the potential difference applied across each of the windings 2, 4, 6 and hence also the current flowing through the windings. This in turn controls the strength and orientation of the magnetic field produced by the windings, which sets the torque produced by the motor.

A current measuring device in the form of a resistor 24 is provided in the ground line 22 between the motor 1 and ground so that the controller 21 can measure the total current flowing though through all of the windings 2, 4, 6. In order to measure the current in each of the windings the total current has to be sampled at precise instances within the PWM period where the voltage applied to each terminal of the winding (and hence the conduction state of a particular phase) is known. If preferred a separate current sensor could be provided for each phase.

The controller in this example uses a Space Vector Modulation (SVM) algorithm although any modulation technique can equally be used within the scope of the present invention and this should not be construed as limiting.

Each winding 2, 4, 6 in a three phase system can only be connected to either the supply rail 20 or the ground line 22 and there are therefore eight possible states of the switches of the control circuit. Using 1 to represent one of the phases being at positive voltage and 0 to represent a phase connected to ground, state 1 can be represented as [100] indicating phase A at 1, phase B at 0 and phase C at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. State 0 is a zero volt state in which all of the windings are connected to ground and state 7 is a zero volt state in which all the windings are connected to the supply rail.

During normal operation when the switching circuit is being controlled by the controller 21 to produce pulse width modulation, each of the phases 2,4,6 will normally be turned on and off once in each PWM period. The relative lengths of time that are taken up in each state will determine the magnitude and direction of the magnetic field produced in each winding, and hence the magnitude and direction of the total torque applied to the rotor.

The motor control circuit of FIGS. 1 and 3 can be used in many applications, and in this embodiment forms part of an electric power steering system. The steering system includes a torque sensor 26 that measures the torque in a steering column, and feeds this to a torque controller. The torque controller calculates a torque demand signal that is indicative of the torque that is to be produced by the motor. This is fed through into the current controller, which converts the torque demand into a current demand according to known characteristics of the motor. The controller then causes the motor to operate and provide the demanded torque. This torque is applied by the motor to the steering system, making it easier for a driver to turn the steering wheel. The system therefore has two closed loops—the torque controller loop and the current controller loop.

Returning to FIG. 3, the controller comprises at an input a torque to current demand converter stage 30. This takes the demanded torque and a measure of the motor rotor position w and generates a current demand signal in the fixed d-q frame. This signal is then fed into a subtractor 32 along with a measure of the actual current flowing in the motor, expressed in the d-q frame and derived from the output of the current sensor 24. The output of the subtractor is an error signal indicative of the difference between the demanded d-q current and the actual measured d-q current.

The error signal is then fed to the input of a proportional-integral (PI) controller stage 34 that converts the current error signal which is in the d-q frame into a voltage signal in the d-q frame, and this is then converted into three phase voltages UVW by a dq-UVW converter 36. This is then converted into the required PWM voltage signals for each phase using the chosen SVM modulation technique by a PWM converter 38. The controller constantly attempts to drive the error signal to zero, which ensures that the current in the motor phases matches the demanded current.

The motor controller 21 should have a sufficiently high bandwidth to allow it to achieve the desired rates of change of the torque demand signal. In a steering system the peak rate of change will depend on how fast the steering can or should react to driver applied torques and is set by the bandwidth of the torque controller and the bandwidth of the current controller. This should not be too high as to cause the circuit controller to track high frequency noise that may be present in the steering system. Typically a bandwidth of several hundred hertz, say 500 Hz, may be chosen for a steering system.

Figure 2:
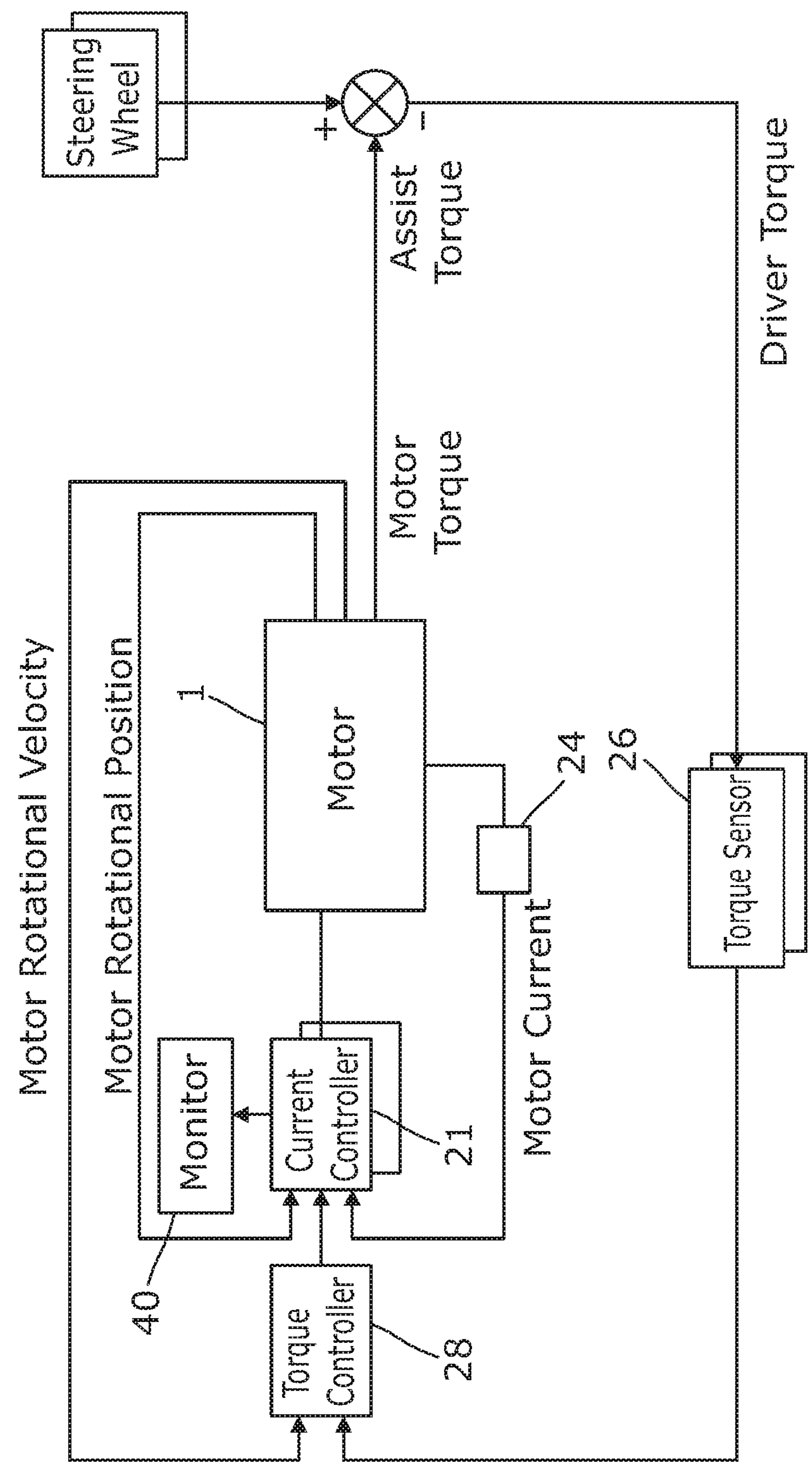
FIG. 2 is a block diagram showing the use of the motor and switching circuit of FIG. 1 in an electric power steering system.
Figure 4:
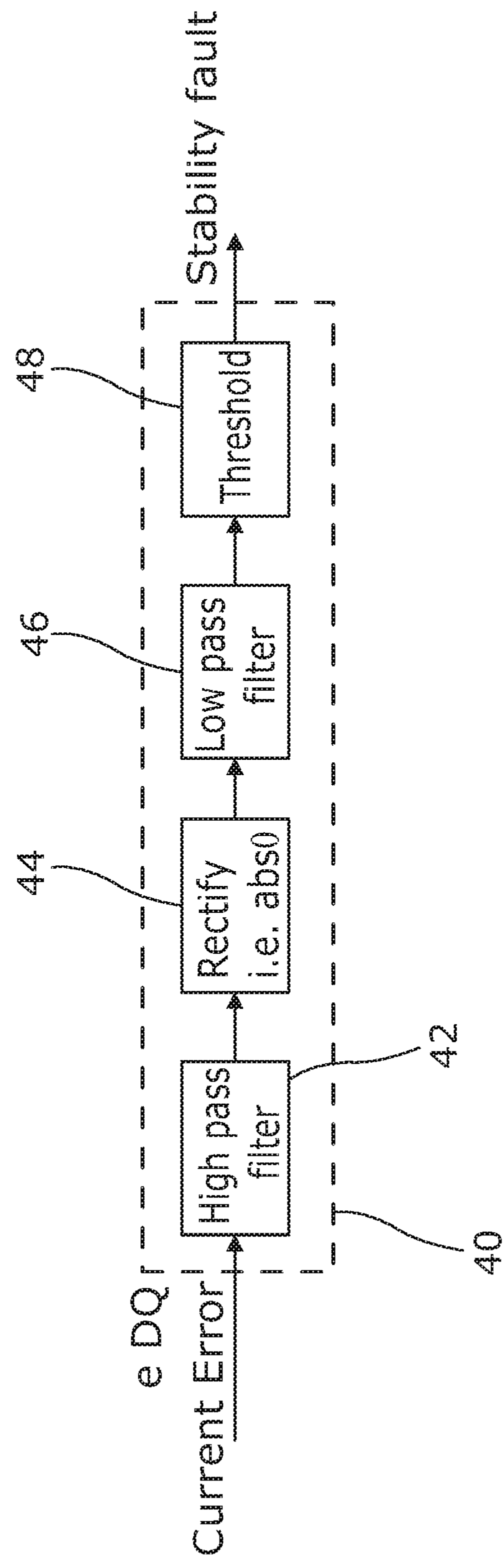
FIG. 4 is a block diagram of a monitoring circuit that is included in the system of FIG. 2 which falls within the scope of the present invention.

As shown in FIGS. 2 and 3, an additional control block called a monitor 40 is inserted into the motor control system. This is shown in more detail in FIG. 4.

Figure 5:
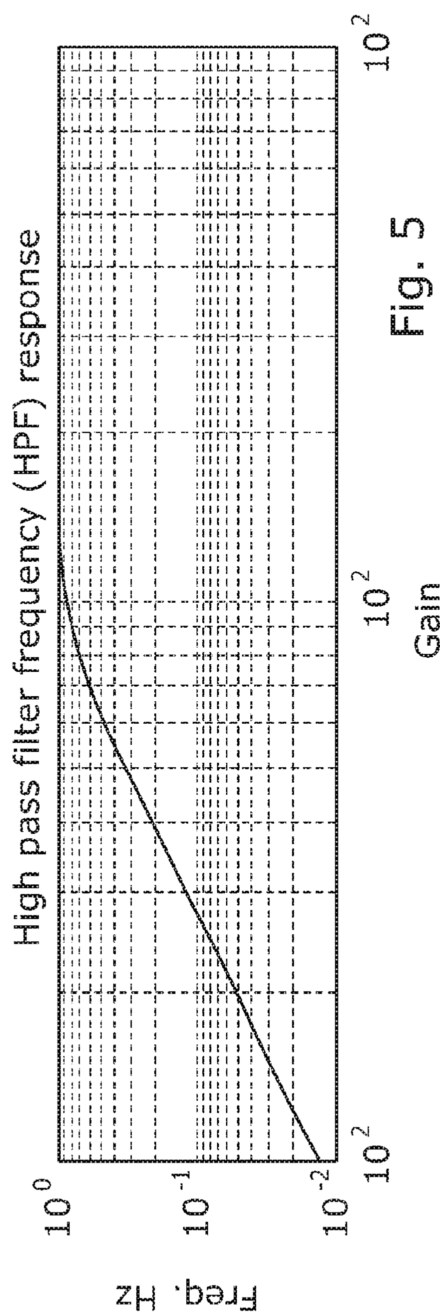
FIG. 5 is plot of input frequency against output frequency for the high pass filter of FIG. 4.
Figure 6:
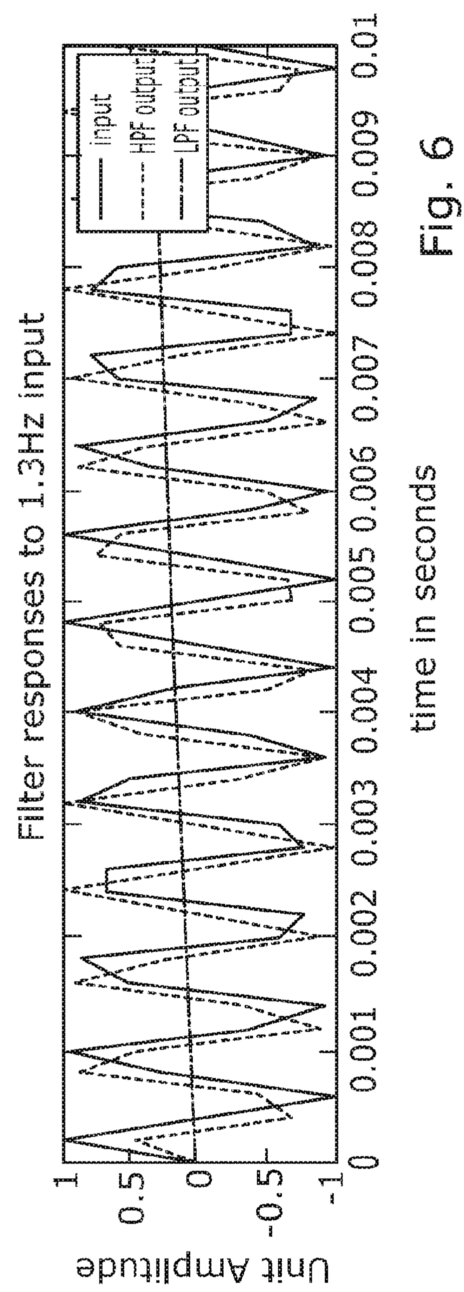
FIG. 6 shows the output of the filter in the event of a fault in which a switch has failed with a high resistance.
Figure 7:
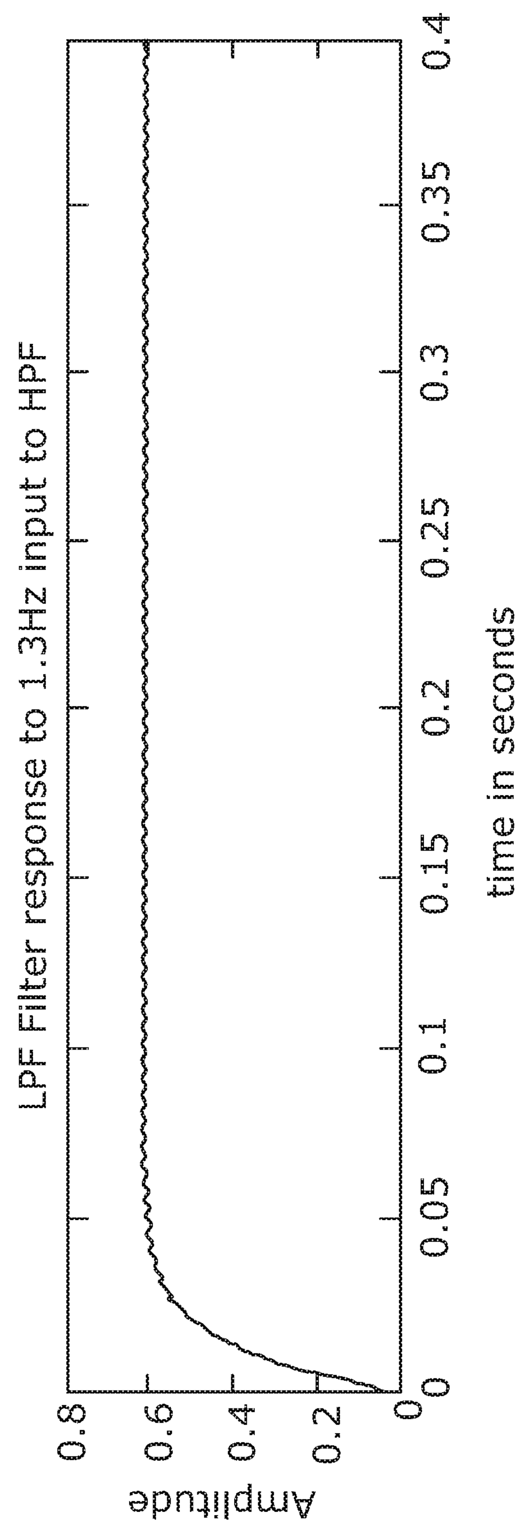
FIG. 7 shows the output of the low pass filter of FIG. 4 in the event of a fault in which a switch has failed with a high resistance.

The monitor 40 receives as an input the current error signal fed to the PI stage 34. The monitor comprises a high pass filter 42 that ensures that only frequencies above the bandwidth of the controller are passed. This may be a first order filter, or a second order filter or higher order. A cut off frequency of 1 khz could be used as shown in FIG. 5. In theory the controller should not respond to this frequency and so during normal operation it should not be present apart from as low level noise.

The output of the filter 42 is fed into the input of a rectifier 44, and the output of the rectifier 44 is then fed into a low pass filter 46. The low pass filter removes any transients which would be due to noise.

The output of the low pass filter 46 is then passed through a threshold detector 48 which produces an output of a first value if the input signal is below a threshold amplitude and an output of a second value if the input exceeds the threshold value. In this example the threshold is set close to the motor short circuit current, perhaps 30 amps or more.

The output of the threshold detector is used as an indicator that a fault is present in the system, and can be fed into the controller which may respond by shutting down the motor control circuit in a controlled manner until the fault is cleared.

During normal motor operation there will not be a significant and persistent frequency component present in the current error signal above the normal motor controller bandwidth, as the motor controller is not tracking frequencies above the bandwidth and should not be introducing such frequencies into the motor. The motor time constant is set by the inductance of the phase windings and the resistance of the windings. This may be, for example, typically of the order of 10 mohms or so. Each time the controller goes through one control loop a revised set of phase voltages will be produced that should produce an expected change of current in the motor as required to keep the error to a minimum.

The applicant has appreciated for the first time that a surprising fault mode can arise in the motor control circuit if a switch of the switching circuit 8 has failed to a low resistance state. This could occur due to a fault in the printed circuit board (pcb) carrying the switch, or debris across the switch terminals.

In a very specific set of circumstances, where the motor is not moving and a torque is demanded, current will flow through the resistance of the fault at the switch and also through the motor phase winding. If the resistance is high enough, say 100 mohms or so, the current will rise faster than it would be expected to rise for a given change in voltage (or fall if the voltage has been reduced). It will rise or fall faster than expected because the rate is no longer set by the time constant of the motor windings. As a voltage is applied, a current will flow directly through the unwanted resistance, and this current as measured by the current sensor 24. The controller will see a larger than expected error because it was not expecting the motor to respond as fast as it has for a given increase in voltage, and indeed faster than normally possible due to the time constant of a healthy motor.

The sudden rise will cause a large magnitude current error signal to be fed to the PI controller stage and the controller will detect this immediately and try to counter it by applying a large counter voltage to the motor phases. The countering action will also not create the expected amount of counter action, and a rapid counter swing in current will occur very quickly. The motor controller will then over-react to this rapid change, and a repeating cycle will be established. The controller will continue to react as fast as possible, dependent on the time taken for a signal to propagate around a full loop of the control loop. After very few cycles the controller will become stuck oscillating between maximum and minimum PWM voltage amplitudes for the motor phases.

The unwanted oscillation will occur at a fixed frequency, set by the maximum switching frequency of the controller which will be above the normal controller bandwidth. This frequency is set by the time it takes for a signal to pass round the control loop, or pass two or three times around the loop. For example, a change in the PWM signal leads to a change in the voltage on the phase which leads to a rise in the current (very fast) which is measured by the current sensor (there may be some delay here as the current must be measured at a specific time in the PWM cycle). The measured current is then compared to the demanded current by the controller and this may be done a bit later. The controller calculates a demand that is then converted to a new PWM signal. This conversion process may take place at a specific time after the controller calculation. Hence there are various delays and implementation details that govern how long it takes a signal to travel round the loop. The oscillation involves two such cycles, one to create the fast current and the second to react to it. The sample rate in this example of the controller is 5 kHz, so two cycles corresponds to a 2.5 kHz frequency of oscillation, but in practice there will be some additional delays due to the scheduling of the current measurement and the implementation of the PWM signals. These add another cycle to the total loop time, giving 1.25 kHz overall or close to that frequency. The frequency will therefore be the reciprocal of the time it takes for a signal to make three full loops around the control loop of the current controller. It may be slightly different due to any "progressive" PWM update that happens part way through a cycle. Therefore in this example the oscillation occurs at 1.3 khz and it is this frequency that is identified and monitored as the indication of the surprising fault mode.

In a steering system this set of circumstances corresponds to a switch fault where the steering is stationary and a torque is applied by the driver. The oscillation of the phase voltages produced by the controller will cause the motor to lock in place and this may prevent the driver turning the wheel.

The additional monitoring circuitry of FIG. 3 will detect this high frequency oscillation and provide an output indicating a fault has occurred. This provides an additional level of safety for the motor control circuit. This is especially advantageous where the motor forms part of an electric power steering system.

The skilled person will understand that references to processing signals present in use of the motor control circuit should be construed broadly to cover processing the signals directly or indirectly. For instance, this term should be construed to cover the processing of any signal that is derived from a signal present in use of the motor control circuit, perhaps a scaled version of a signal present in the control loop or a signal which has been shifted up or down in frequency or has otherwise been conditioned.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method of monitoring an electric motor circuit of the kind comprising an electric motor having a plurality of phases connected together in a star or delta configuration, a switching circuit comprising a plurality of electrical switches arranged in a bridge, the switches being operable in response to signals from a controller to selectively connect the phases to a power supply so as to cause current to flow through the phases of the motor, the controller being responsive to a current error signal dependent on a difference between a demanded motor current value and an actual motor current value indicative of the actual current flowing in the motor, the method comprising the steps of processing at least one signal that is present in use of the electric motor circuit to identify a frequency component of the at least one signal that meets certain predefined criteria and in the event that the frequency component is identified and does meet the predefined criteria providing an indication that there is a fault in which the step of identifying the component frequency comprises identifying a frequency equal to, or substantially equal to, a reciprocal of twice a time that it takes for a signal to propagate around a control loop that includes the controller, or equal to or substantially equal to the reciprocal of three or another integer multiple of the time taken to propagate around the control loop.

2. The method according to claim 1 in which the at least one signal processed by the method comprises the current error signal that is fed into the controller.

3. The method according to claim 1 in which the at least one signal comprises a signal indicative of the current flowing in a ground line, or a DC line of a power supply to the motor.

4. The method according to claim 1 in which the step of processing the at least one signal comprises passing the at least one signal through a high pass filter, the filter having a cut off frequency below the frequency component that is being identified.

5. The method according claim 1 in which the step of processing the at least one signal comprises identifying a single frequency of interest or identifying signals within a range of frequencies of interest.

6. The method according to claim 5 comprising identifying a frequency component that exceeds a normal bandwidth of the controller and motor.

7. The method according to claim 1 that comprises processing the at least one signal, or a signal derived from it, and determining that it meets at least one of the predefined criteria in the event that the duration over which the signal has been present, either continuously present or discontinuously, meets or exceeds a threshold duration.

8. The method according to claim 7 in which the step of determining that the frequency component of interest exceeds the threshold comprises passing the at least one signal, or a signal derived from the at least one signal, through a rectifier and then passing the rectified signal through a low pass filter, the low pass filter removing any transient instances of the frequency component, thereby removing any components at the frequency that is of interest that do not meet the criteria.

9. The method according to claim 1 which comprises the step of determining if the signal meets the predefined criteria by determining whether the magnitude of the frequency component meets or exceeds a predefined threshold magnitude.

10. A motor control circuit for use in controlling an electric motor of the kind having a plurality of phases, the control circuit comprising:

a switching circuit comprising a plurality of switches arranged in a bridge, a motor controller which generates phase voltage signals to be applied to the switches of the switching circuit to cause the switches to selectively connect the phases to supply rails of the motor so as to cause current to flow through the phases according to a torque demanded from the motor, at least one current sensor that senses current flowing in the motor;

the motor controller being responsive to a current error signal dependent on the difference between a demanded motor current value and an actual motor current value indicative of the actual current flowing in the motor as sensed by the at least one current sensor, and a monitoring circuit which in use processes at least one signal that is present in use of the motor controller and is arranged to identify a frequency component of the at least one signal that meets certain predefined criteria and in the event that the frequency component is identified and does meet the criteria providing an indication that there is a fault, in which the monitoring circuit is adapted to identify the frequency component equal to, or substantially equal to a reciprocal of twice a time that it takes for a signal to propagate around a control loop that includes the motor controller, or equal to or substantially equal to the reciprocal of three or another integer multiple of the time taken to propagate around the control loop.

11. The motor control circuit according to claim 10 in which the monitoring circuit forms a part of the controller.

12. The motor control circuit according to claim 10 in which the at least one signal comprises at least one of the current error signal and the measured current signal.

13. The motor control circuit according to claim 10 in which the monitoring circuit comprises a high pass filter into which the at least one signal is fed, a rectifier into which the output of the high pass filter is fed, a low pass filter into which the output of the rectifier is fed, and a threshold detector into which the output of the low pass filter is fed and in which the monitoring circuit is adapted to provide an indication of a fault if the output of the threshold detector indicates that the threshold has been passed.

14. The motor control circuit according to claim 13 in which the high pass filter has a cut off frequency above a normal bandwidth of the motor controller but below the frequency of the frequency component that is to be identified.

15. The motor control circuit according to claim 10 further adapted to stop the motor in the event that the monitoring circuit indicates a fault is present.

* * * * *